United States Patent
Wagner et al.

(10) Patent No.: US 11,152,660 B2
(45) Date of Patent: Oct. 19, 2021

(54) DEVICE FOR ACCOMMODATING AT LEAST ONE ENERGY MODULE FOR A MOTOR VEHICLE

(71) Applicant: Bayerische Motoren Werke Aktiengesellschaft, Munich (DE)

(72) Inventors: Daniel Wagner, Munich (DE); Christoph Klaus, Oberschleissheim (DE); Holger Staack, Seeshaupt (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1090 days.

(21) Appl. No.: 14/956,491

(22) Filed: Dec. 2, 2015

(65) Prior Publication Data
US 2016/0087256 A1    Mar. 24, 2016

Related U.S. Application Data

(63) Continuation of application No. PCT/EP2014/065346, filed on Jul. 17, 2014.

(30) Foreign Application Priority Data

Aug. 6, 2013 (DE) ...................... 10 2013 215 436.4

(51) Int. Cl.
    *H01M 2/10* (2006.01)
    *H01M 50/20* (2021.01)
    *B60L 58/10* (2019.01)

(52) U.S. Cl.
    CPC ............. *H01M 50/20* (2021.01); *B60L 58/10* (2019.02); *H01M 2220/20* (2013.01); *Y10S 903/952* (2013.01)

(58) Field of Classification Search
    CPC ............... H01M 2220/20; H01M 50/20; Y10S 903/952
    See application file for complete search history.

(56) References Cited

U.S. PATENT DOCUMENTS 2,817,409 A * 12/1957 Cullmann ........... H01M 2/1083
                                                        180/68.5
4,216,839 A *  8/1980 Gould .................. B60L 3/0015
                                                         180/65.1
(Continued)

FOREIGN PATENT DOCUMENTS

CN        101450605 A     6/2009
CN        102576831 A     7/2012
(Continued)

OTHER PUBLICATIONS

Chinese Office Action issued in counterpart Chinese Application No. 201480035312.4 dated Apr. 27, 2017 with English-language translation (fourteen (14) pages).
(Continued)

*Primary Examiner* — Sadie White
(74) *Attorney, Agent, or Firm* — Crowell & Moring LLP

(57) ABSTRACT

A device is provided for accommodating at least one energy module for a motor vehicle, in particular for accommodating at least one high-voltage energy module for a hybrid or electric vehicle. The device includes a housing having a first and a second accommodating portion for accommodating at least one energy module, and a connecting portion arranged between the first and the second accommodating portions. The connecting portion is designed such that, when the housing is subjected to a predetermined force, deformation being the result, the connecting portion allows the first and the second accommodating portions to move relative to one another in a predetermined manner as a result of the deformation.

12 Claims, 3 Drawing Sheets

(56) References Cited

U.S. PATENT DOCUMENTS

| | | | |
|---|---|---|---|
| 5,555,950 A * | 9/1996 | Harada | H01M 50/20 180/65.1 |
| 6,482,542 B1 | 11/2002 | Takaki et al. | |
| 6,849,357 B1 * | 2/2005 | Kasahara | H01M 2/0417 29/623.1 |
| 2006/0087279 A1 | 4/2006 | Chen | |
| 2009/0145676 A1 | 6/2009 | Takasaki et al. | |
| 2009/0166116 A1 * | 7/2009 | Kiya | B60L 3/0007 180/68.5 |
| 2010/0147608 A1 | 6/2010 | Okabe | |
| 2010/0289295 A1 * | 11/2010 | Yoda | B60L 3/0007 296/187.03 |
| 2010/0307848 A1 | 12/2010 | Hashimoto et al. | |
| 2011/0036654 A1 | 2/2011 | Rinderlin et al. | |
| 2012/0103714 A1 * | 5/2012 | Choi | B60K 1/04 180/68.5 |
| 2012/0121959 A1 * | 5/2012 | Yamada | B60K 1/04 429/100 |
| 2012/0129036 A1 * | 5/2012 | Watanabe | H01M 2/1077 429/151 |
| 2012/0219836 A1 * | 8/2012 | Heise | H01M 10/0525 429/120 |
| 2012/0224326 A1 | 9/2012 | Kohlberger et al. | |
| 2012/0251862 A1 * | 10/2012 | Kano | B60K 1/04 429/99 |
| 2013/0075173 A1 | 3/2013 | Kato et al. | |
| 2013/0252059 A1 * | 9/2013 | Choi | H01M 2/1094 429/100 |

FOREIGN PATENT DOCUMENTS

| | | |
|---|---|---|
| CN | 103009980 A | 4/2013 |
| DE | 11 2008 001 224 T5 | 4/2010 |
| DE | 10 2009 052 371 A1 | 6/2010 |
| DE | 10 2009 040 197 A1 | 3/2011 |
| DE | 10 2010 050 826 A1 | 5/2012 |
| DE | 10 2011 010 365 A1 | 8/2012 |
| DE | 10 2012 108 816 A1 | 3/2013 |
| DE | 10 2012 000 622 A1 | 7/2013 |
| JP | 2004-345448 A | 12/2004 |
| JP | 2007-331669 A | 12/2007 |
| JP | 4294372 B2 | 7/2009 |
| JP | 2010-188965 A | 9/2010 |
| JP | 2010-284984 A | 12/2010 |
| JP | 2013-193686 A | 9/2013 |
| WO | WO 2007/100072 A1 | 9/2007 |
| WO | WO 2012/163832 A1 | 12/2012 |

OTHER PUBLICATIONS

International Search Report (PCT/ISA/210) issued in PCT Application No. PCT/EP2014/065346 dated Oct. 13, 2014 with English-language translation (four (4) pages).

German Search Report issued in counterpart German Application No. 10 2013 215 436.4 dated Mar. 28, 2014 with partial English-language translation (ten(10) pages).

Chinese-language Office Action issued in counterpart Chinese Application No. 201480035312.4 dated Jan. 4, 2018 with English translation (Fourteen (14) pages).

Japanese-language Office Action issued in counterpart Chinese Application No. 2016-532293 dated Jul. 25, 2018 (three (3) pages).

* cited by examiner

DEVICE FOR ACCOMMODATING AT LEAST ONE ENERGY MODULE FOR A MOTOR VEHICLE

CROSS REFERENCE TO RELATED APPLICATIONS

This application is a continuation of PCT International Application No. PCT/EP2014/065346, filed Jul. 17, 2014, which claims priority under 35 U.S.C. § 119 from German Patent Application No. 10 2013 215 436.4, filed Aug. 6, 2013, the entire disclosures of which are herein expressly incorporated by reference.

BACKGROUND AND SUMMARY OF THE INVENTION

The present invention relates to a device for accommodating at least one energy module for a motor vehicle, in particular for accommodating at least one high-voltage energy module for a hybrid or electric vehicle. Furthermore, the invention relates to a vehicle having such a device.

Such devices for accommodating one or more energy modules, such as energy storage modules or energy converter modules, are widely known as energy stores or energy storage devices in the finished, installed state in a motor vehicle.

The energy modules are usually formed by mutually coupled energy cells.

Examples of energy modules formed as energy storage modules may be arrangements of a plurality of battery cells, for example electric batteries from electrochemical storage cells, such as lithium-ion storage cells, double layer capacitors, etc. An example of an energy module formed as an energy converter module is a fuel cell stack, which includes a number of mutually coupled fuel cells. The individual cells may be compressed, for example, into modules which can be bolted to the housing.

Typically, such devices are used inter alia for accommodating energy modules in connection with, for example, hybrid or electric vehicles. To this end, conventional devices typically have a fixed-structure housing, which includes a housing base and a housing cover, which are connected by screws and which surround the power module. Furthermore, mounting portions are typically provided on the housing, via which the housing can be connected with the elements or components arranged on the vehicle structure side or vehicle body side for securing the housing to the vehicle.

On the one hand, the housing of such conventional devices absorbs all external forces, such as those in an accident or collision or vibrations arising in the motor vehicle, etc. On the other hand, the housing also protects the power module against external environmental influences, such as against the ingress of water into the housing. For this purpose, seals arranged between the housing base and the housing cover are provided which also prevent the leakage of an electrolyte, which is present in the energy module, out of the housing; this is all the more significant from a safety perspective, as the electrolyte could ignite while leaking and thus lead to burning of the vehicle.

In particular in the installation space of the fuel tank, a two-part device for accommodating the energy module is used, which device comprises a first and a second accommodating portion for accommodating the energy module. The accommodating portions are connected by a connecting portion or bridge which is arranged over the exhaust system and the drive or transmission shaft.

In the case of an accident, in which a collision from a lateral direction on a longitudinal side of the vehicle occurs, for example, energy absorption elements and other components such as longitudinal members of the vehicle first absorb the external force under elastic and/or plastic deformation and transfer at least parts of the external force to the device for accommodating the energy modules, whereby the device may be buckled or deformed in the region of the connecting portion or in the bridge region due to the force of leverage.

To prevent damage to the energy modules in the case of an externally applied force to the housing, the housing is usually made of a rigid metal material such as steel, sheet steel or aluminum and, for example, made in the latter case as a solid component by means of an aluminum die-casting process. However, aside from the mass of the one or more energy modules, the mass of the housing represents the largest portion of the total weight of the device.

This has the result that the heavy weight of the device decreases the performance of the vehicle and increases the energy needs of the vehicle.

The object of the invention is, therefore, to provide a device for accommodating at least one energy module, with which energy modules can be protected from damage in case of an accident while simultaneously achieving a reduction in weight.

This and other objects are achieved according to the invention by a device for accommodating at least one energy module for a motor vehicle, in particular for accommodating at least one high-voltage energy module for a hybrid or electric vehicle, wherein the device includes a housing having a first and a second accommodating portion for accommodating at least one energy module, and a connecting portion arranged between the first and the second accommodating portions. The connecting portion is designed such that, when the housing is subjected to a predetermined force resulting in deformation, the connecting portion allows the first and second accommodating portions to move relative to one another in a predetermined manner as a result of the deformation.

For example, the operating or crash loads or stresses arising during a crash or accident (for instance in a front, rear or side crash) may thereby be absorbed in a targeted manner by the connecting portion, while the function of sealing of the at least one energy module or the shielding of the at least one energy module from environmental influences in the region of the accommodating portion may be at least temporarily maintained.

A deformation resistance of the accommodating portions and a deformation resistance of the connecting portion may be selected such that the connecting portion deforms under the application of a predetermined force within a predefined force range, while the accommodating portions which are moved as a result of the deformation of the connecting portion undergo no or almost no plastic deformation.

Accordingly, the connecting portion may have a lower deformation resistance, in particular a lower deformation resistance with regard to plastic deformation, than the accommodating portions. Further, the connecting portion may have a lower rigidity than the accommodating portions.

For this purpose, a wall thickness of the connecting portion may be made smaller than a wall thickness of the at least one accommodating portion.

Additionally or alternatively, the connecting portion and the accommodating portions may be formed from different materials. For example, the connecting portion may consist of polypropylene, and the accommodating portions may consist of fiber-reinforced polyamide.

The device according to the invention may be further developed in an advantageous manner such that the housing includes a housing base and a housing cover, and the connecting portion includes a connecting portion of the housing base and a connecting portion of the housing cover with respective end portions, which are pressed flatly against one another by way of a releasable clamp.

The connecting portion of the housing base and/or the connecting portion of the housing cover may have at least one chamfer, which is formed such that, during a relative movement of an accommodating portion selected from the first and the second accommodating portions in the direction of the other accommodating portion selected from the first and the second accommodating portions, the end of the clamp comes into contact with the chamfer. When a predetermined distance between the two accommodating portions is reached, the clamp is released by way of a force exerted by the chamfer.

Preferably, the clamp is fixed on the connecting portion of the housing by an engagement device, wherein the connecting portion of the housing cover and/or of the housing base comprises one of an engagement lug and an engagement groove, and the clamp comprises the other of the an engagement lug and the engagement groove. The engagement lug is engaged in the engagement groove.

The vehicle according to the invention, in particular a motor vehicle, preferably hybrid or electric vehicle, includes the above-described device according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
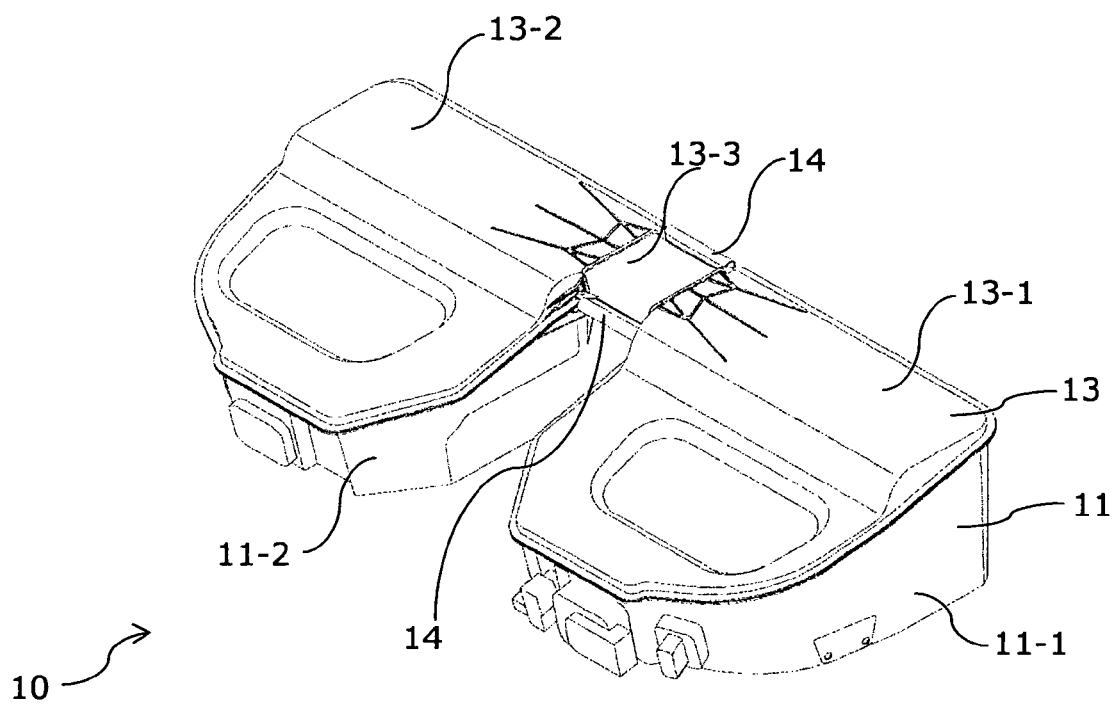
FIG. 1 is a perspective view of a device according to an embodiment of the invention for accommodating energy modules for a motor vehicle.

FIG. 1 shows, in a perspective view a representation of an exemplary device 10 according to the invention for accommodating energy modules (not shown), for example energy storage modules and/or energy converter modules, for a motor vehicle. The device 10 can, for example, be provided to accommodate six energy modules, which are each formed by high-voltage energy modules, for a hybrid or electric vehicle. In other embodiments, the device 10 may also be provided to accommodate any desired number of energy modules, to the extent permitted by the installation space conditions in the respective motor vehicle. Each energy module may have a plurality of intercoupled energy cells. For example, the energy module may be formed by an arrangement of one or more battery cells, for instance electrochemical storage cells such as lithium-ion storage cells, double layer capacitors, fuel cells, etc.

The device 10 has a housing 11, 13, including a housing base 11 and a housing cover or housing upper part 13. Both the housing base 11 and the housing upper part 13 are preferably integrally formed. A first accommodating portion 11-1 of the housing base 11, right in the forward direction of the vehicle, and a second accommodating portion 11-2 of the housing base 11, left, are designed to accommodate the energy module, wherein for example the energy module may be bolted onto the housing 11, 13, or fixed on a mount arranged on the housing 11, 13. The housing cover or the housing upper part 13 includes corresponding first and second accommodating portions 13-1, 13-2, which correspondingly cover the first and second receiving portions 11-1, 11-2 of the housing base 11.

Together with the first accommodating portion 13-1 of the housing cover 13, the first accommodating portion 11-1 of the housing base 11 forms a first accommodating portion of the housing 11, 13, while the second accommodating portion 11-2 of the housing base 11 forms a second accommodating portion of the housing 11, 13 together with the second accommodating portion 13-2 of the housing cover 13.

The first and the second accommodating portions 11-1, 11-2 of the housing base 11 are connected via a connecting portion 11-3 of the housing base 11, which is arranged above a central tunnel of the motor vehicle, in which may be provided an exhaust system and a drive or transmission shaft of the vehicle, so that the first and the second accommodating portions 11-1, 11-2 of the housing base are provided such that they are respectively arranged in the transverse direction of the motor vehicle laterally adjacent to the central tunnel.

The first and the second accommodating portions 13-1, 13-2 of the housing cover 13 are likewise connected via a connecting portion 13-3, which is arranged above the connecting portion 11-3 of the housing base 11 and thus also above the central tunnel.

Together with the connecting portion 13-3 of the housing cover 13, the connecting portion 11-3 of the housing base 11 forms a connecting portion of the housing 11, 13.

The housing 11, 13 is preferably designed such that it may be arranged at a distance from the central tunnel, in order to avoid or at least reduce the transfer of vibrations from the drive or transmission shaft. For the protection of the housing 11, 13 from the heat emitted from the exhaust system, heat shields may further be provided between the exhaust system and the housing 11, 13, and/or a correspondingly heat-resistant material may be used as the material of the housing 11, 13.

The housing 11, 13 may be attached and held on the vehicle structure side or vehicle body side via attachment portions, not shown.

In a particularly advantageous manner, the connecting portion 11-3, 13-3 of the housing 11, 13 is designed such that, when the housing 11, 13 is subjected to a predetermined force within a predetermined force range resulting in deformation, preferably plastic deformation, the connecting portion 11-3, 13-3 of the housing 11, 13 allows the first and the second accommodating portions 11-1, 11-2, 13-1, 13-2 of the housing 11, 13 to move relative to one another in a predetermined manner as a result of the deformation.

In particular, the housing 11, 13 is designed such that, when a predetermined force acting in the transverse direction of the vehicle is applied to the housing 11, 13, the connecting portion 11-3, 13-3 of the housing 11, 13 allows a relative movement resulting from the deformation of those accommodating portions 11-1, 11-2, 13-1, 13-2 of the housing base 11 and the housing cover 13, which are arranged closer to the point of application of force, in the direction of the respective other accommodating sections of the housing base 11 and the housing cover 13. This relative movement is designed to occur, for example, if an external force oriented or acting in the direction of the center of the vehicle acts on the motor vehicle in the transverse direction of said motor vehicle, which may happen in an accident, such as a side impact or side collision.

For energy absorption, the connecting portions 11-3, 13-3 are designed to act under plastic deformation as energy absorption elements during the application of a predetermined force on the housing. Here, the connecting portions 11-3, 13-3 may be designed such that they absorb the bulk of the energy resulting from the application of force or absorb all of the energy resulting from the application of force. Alternatively, they may be designed to cause under plastic and/or elastic deformation during the application of force on the housing 11, 13 the movement of the respective accommodating portions 11-1, 11-2, 13-1, 13-2 of the housing base 11 and the housing cover 13 in the direction of an energy absorption element on the vehicle structure side, which absorbs the bulk of the energy resulting from the application of force along with the vehicle structure surrounding the accommodating portions 11-1, 11-2, 13-1, 13-2 of the housing base 11 and the housing cover 13. In this case, the energy absorption element on the vehicle structure side can be formed, for example, by the central tunnel of the vehicle as well as components or elements lying thereunder.

In both cases, the deformation resistances of the accommodating portions 11-1, 11-2, 13-1, 13-2 of the housing base 11 and the housing cover 13 and the deformation resistances of the connecting portions 11-3, 13-3 of the housing base 11 and the housing cover 13 are selected such that, during application of a predetermined force within the predefined force range, the connecting portions 11-3, 13-3 of the housing base 11 and the housing cover 13 deform, while the accommodating portions 11-1, 11-2, 13-1, 13-2 of the housing base 11 and the housing cover 13 undergo no, or almost no, plastic deformation under the same or nearly the same stress.

In this way, in the case of a force acting on a longitudinal side of the motor vehicle, such as occurs during an impact of the longitudinal side against a pole in the course of a spinning of the motor vehicle or an accident or collision with another vehicle, which collides for example against the left or the right longitudinal side of the vehicle, the respective left or right accommodating portions 11-1, 11-2, 13-1, 13-2 of the housing base 11 and the housing cover 13, onto which the external force is transferred via other components of the vehicle, may shift relative to the respective other accommodating portions 11-1, 11-2, 13-1, 13-2 of the housing base 11 and the housing cover 13, i.e. they may move toward the other accommodating portions 11-1, 11-2, 13-1, 13-2 of the housing base 11 and the housing cover 13. Here, the connecting portions 11-3, 13-3 of the housing base 11 and the housing cover 13 are initially elastically and then possibly plastically deformed, while the accommodating portions 11-1, 11-2, 13-1, 13-2 experience no plastic deformation or almost no plastic deformation.

Additional energy is thus dissipated across the surrounding body components, and the accommodating portions 11-1, 11-2, 13-1, 13-2 of the housing base 11 and the housing cover 13 are only much later involved in the absorption of energy. In other words, through the design of the housing 11, 13 according to the invention, the level of force acting on the accommodating portions 11-1, 11-2, 13-1, 13-2 of the housing base 11 and the housing cover 13 as well as the energy to be absorbed therefrom is substantially reduced. In this way, the risk of penetration of objects into the housing 11, 13 and thus the risk of damage to the accommodated energy module and leakage of the electrolyte is reduced.

The difference in deformation resistance, and in particular rigidity, can be achieved for example through the use of different materials for the accommodating portions 11-1, 11-2, 13-1, 13-2 and the connecting portions 11-3, 13-3 and/or via the establishment of different wall thicknesses for the accommodating portions 11-1, 11-2, 13-1, 13-2 and the connecting portions 11-3, 13-3. For example, plastic may be used as a material for the housing 11, 13, wherein polypropylene could be selected for the connecting portions 11-3, 13-3, and polyamide with 30% glass fiber reinforcement could be selected for the accommodating portions 11-1, 11-2, 13-1, 13-2.

In order to achieve a targeted deformation of the connecting portions 11-3, 13-3 in the case of a force acting on the housing 11, 13, the connecting portions 11-3, 13-3 of the housing base 11 and the housing cover 13 are connected by way of a releasable clamp 14, which releasably presses together the connecting portions 11-3, 13-3 of the housing base 11 and of the housing cover 13, while the accommodating portions 11-1, 11-2, 13-1, 13-2 of the housing base 11 and the housing cover 13 can be connected by use of screws.

Figure 2:
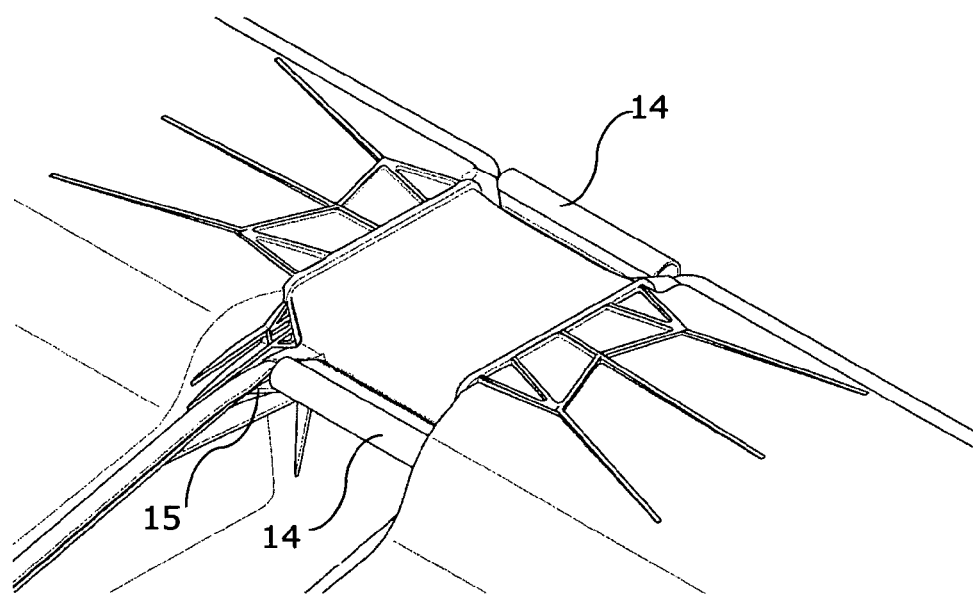
FIG. 2 shows an enlarged view of a central region of the device shown in FIG. 1.
Figure 3:
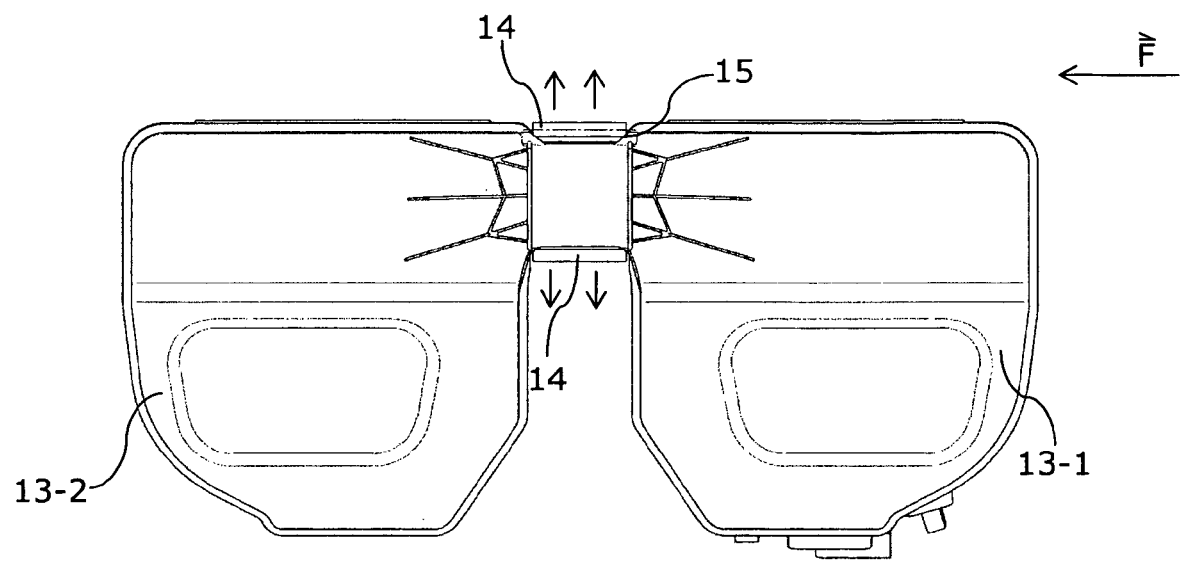
FIG. 3 is a top view of the device of FIG. 1.

So that the clamp 14 releases in the case of lateral force, for example as is shown FIG. 3, when force F acts in the transverse direction of the vehicle on the accommodating portions 11-1, 13-1 of the housing base and the housing cover 13, the connecting portion 11-3 of the housing base 11 and/or the connecting portion 13-3 of the housing upper part 13 includes a chamfer 15, as is shown in FIGS. 2 and 3. In the event that the accommodating portions 11-1, 11-2, 13-1, 13-2 move toward one another, the chamfer 15 causes a force in the longitudinal direction of the vehicle (see short arrows in FIG. 3) to act on the clamp 14, whereby this is pressed and released in the longitudinal direction of the vehicle. The chamfer 15 is, in particular, formed such that, in a relative movement of one of the accommodating portions 11-1, 11-2, 13-1, 13-2 of the housing 11, 13 in the direction of the other accommodating portions 11-1, 11-2, 13-1, 13-2 of the housing 11, 13, an end face of the clamp 14 comes into contact with the chamfer 15, slides along said chamfer during further movement and, when a predetermined distance between the first and the second accommodating portions 11-1, 11-2, 13-1, 13-2 of the housing 11, 13 is reached, the clamp 14 is released from the housing 11, 13.

In this way, a further reduction of the level of force in the accommodating portions 11-1, 11-2, 13-1, 13-2 of the housing can be achieved, as when the clamp 15 is released, the connecting portions 11-3, 13-3 of the housing base 11 and the housing upper part 13 can move away from one another and both the connecting portion 11-3 of the housing base 11 and the connecting portion 13-3 of the housing upper part 13 can be unfolded. Due to this lowered level of force, material and thus weight (approximately 8 kg in comparison with an aluminum housing), costs and installation space of the structure can be saved. Furthermore, the use of materials other than aluminum, which are suitable for a lower load, becomes possible in this way. In other free installation spaces of the vehicle, further deformation elements may be used, which on the one hand absorb energy and which on the other hand support the displacement of the accommodating portions 11-1, 11-2, 13-1, 13-2 of the housing base 11 and the housing cover 13 toward one another.

Figure 4:
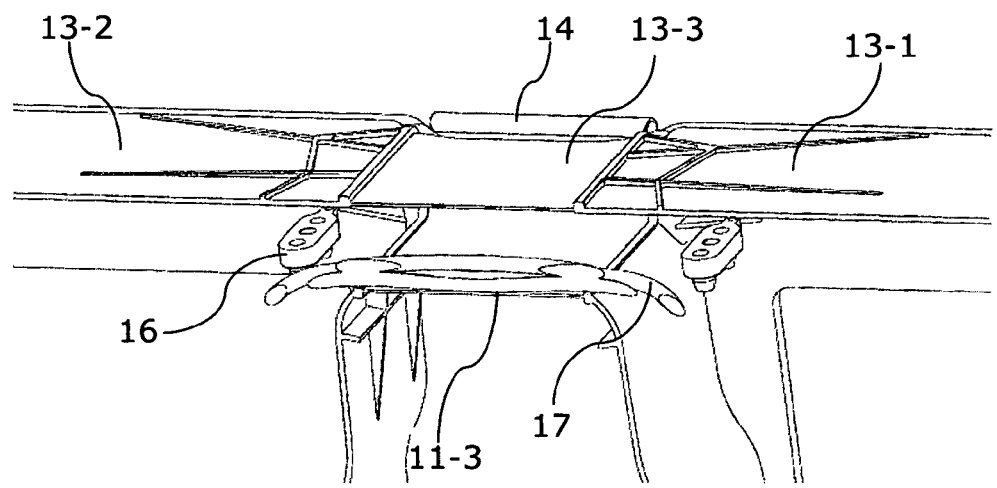
FIG. 4 is a sectional view of the central region of the device of FIG. 1.

As shown in FIG. 4, the energy modules arranged in the accommodating portions 11-1, 11-2 of the housing base 11 are connected via lines 17, such as electric lines or cooling lines for cooling the energy modules. The lines preferably extend into the connecting portions 11-3, 13-3 in a meandering or omega form, as these forms are more tolerant to deformation as compared to a rectilinear formation of the lines, whereby a risk of damage of the lines in the event of deformation of the connecting portions 11-3, 13-3 is reduced. In one embodiment, the cooling lines may also be designed as tubes in the region of the connecting portions 11-3, 13-3, which are likewise tolerant to deformation to a certain degree. To determine the position of the lines in the accommodating portions, the lines 17 can be connected via connecting elements 16 fixed on the housing 11, 13 to lines extending in the direction of the energy modules.

Figure 5:
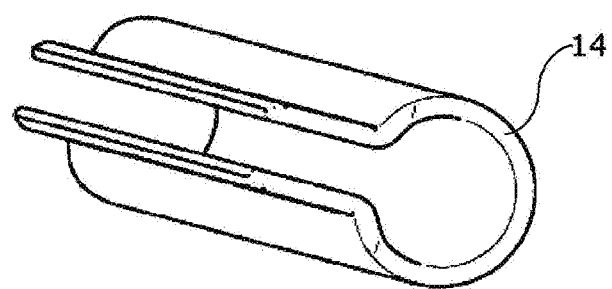
FIG. 5 is a perspective view of a clamp represented in FIGS. 1 to 4.
Figure 6:
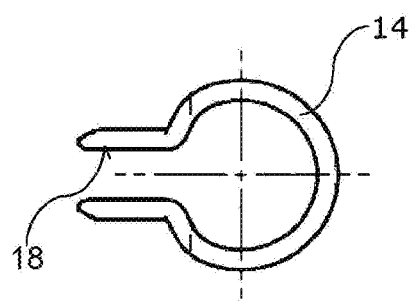
FIG. 6 is a cross-sectional view of the clamp shown in FIG. 5.

The clamp 14 shown in FIGS. 5 and 6 is designed, on the basis of its shape and/or on the basis of its material, to supply the force necessary for the sealing of the housing. For example, the clamp 14 may be formed from glass fiber reinforced plastic or from a spring steel. Engagement lugs (not shown) may be provided on the surfaces 18 of the clamp 14 abutting the connecting portions 11-3, 13-3 of the housing base or the housing cover, said engagement lugs engaging in corresponding grooves provided on end portions of the connection portions 11-3, 13-3 of the housing base 11 or the housing cover 13, in order to prevent an inadvertent release of the clamp 14, for example as a result of vibrations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for accommodating an energy module for a motor vehicle, the device comprising:
    a housing having separate first and second accommodating portions and at least one connecting portion extending between and connecting the first and second accommodating portions; and
    a releasable clamp,
    wherein
        the first accommodating portion is configured to accommodate one or more energy modules in a first energy module receiving volume inside the first accommodating portion,
        the second accommodating portion is configured to accommodate one or more further energy modules in a second energy module receiving volume inside the second accommodating portion,
        the at least one connecting portion is arranged between the first and second accommodating portions and between the first and second energy module receiving volumes,
        the housing comprises a housing base and a housing cover,
        the releasable clamp is configured to press the cover and base portions of the at least one connecting portion flatly against one another,
        a cover portion of the first accommodating portion of the housing cover, a cover portion of the second accommodating portion of the housing cover and a cover portion of the at least one connecting portion are integrally formed,
        a base portion of the first accommodating portion of the housing base, a base portion of the second accommodating portion of the housing base and a base portion of the at least one connecting portion are integrally formed,
        the at least one connecting portion is designed such that, when the housing is subjected to a predetermined force that results in deformation, the at least one connecting portion allows the first and second accommodating portions to move relative to one another in a predetermined manner as a result of the deformation,
        the base portion of the at least one connecting portion and/or the cover portion of the at least one connecting portion comprises at least one chamfer, and
        the at least one chamfer is formed such that, during relative movement of one accommodating portion in a direction of the other accommodating portion, an end of the releasable clamp contacts the at least one chamfer and, when a predetermined distance between the one and the other accommodating portions is reached, the releasable clamp is released via a force exerted by the at least one chamfer on the end of the clamp in a direction parallel to a longitudinal direction of the motor vehicle when the device is installed in the motor vehicle.

2. The device according to claim 1, wherein
    a deformation resistance of the first and second accommodating portions and a deformation resistance of the at least one connecting portion are selected such that the at least one connecting portion deforms under application of the predetermined force within a predefined force range, while the first and second accommodating portions are moved as a result of the deformation of the at least one connecting portion but undergo substantially no plastic deformation.

3. The device according to claim 2, wherein the at least one connecting portion has a lower stiffness than that of the first and second accommodating portions.

4. The device according to claim 1, wherein a wall thickness of the at least one connecting portion is less than a wall thickness of at least one of the first and second accommodating portions.

5. The device according to claim 3, wherein a wall thickness of the at least one connecting portion is less than a wall thickness of at least one of the first and second accommodating portions.

6. The device according to claim 1, wherein the at least one connecting portion is formed of a material different from that of the first and second accommodating portions.

7. The device according to claim 6, wherein the at least one connecting portion is formed of polypropylene and at least one of the first and second accommodating portions is formed of fiber-reinforced polyamide.

8. The device according to claim 1, wherein the releasable clamp is fixed on the base portion of the at least one connecting portion and the cover portion of the at least one connecting portion via an engagement device.

9. The device according to claim 8, wherein:
    the cover portion of the at least one connecting portion and/or the base portion of the at least one connecting portion is provided with one of an engagement lug or an engagement groove,
    the releasable clamp is provided with the other of the engagement lug or the engagement groove, and
    the engagement lug and the engagement groove are configured to engage one another.

10. The device according to claim 1, wherein the housing is configured to accommodate an electrical energy module for a hybrid or electric vehicle.

11. A vehicle, comprising:
one or more energy modules for the vehicle;
a housing having separate first and second accommodating portions and at least one connecting portion extending between and connecting the first and second accommodating portions; and
a releasable clamp,
wherein
the first accommodating portion is configured to accommodate one or more energy modules in a first energy module receiving volume inside the first accommodating portion,
the second accommodating portion is configured to accommodate one or more further energy modules in a second energy module receiving volume inside the second accommodating portion,
the at least one connecting portion is arranged between the first and second accommodating portions and between the first and second energy module receiving volumes,
the housing comprises a housing base and a housing cover,
a cover portion of the first accommodating portion of the housing cover, a cover portion of the second accommodating portion of the housing cover and a cover portion of the at least one connecting portion are integrally formed,
a base portion of the first accommodating portion of the housing base, a base portion of the second accommodating portion of the housing base and a base portion of the at least one connecting portion are integrally formed,
the releasable clamp is configured to press the cover and base portions of the at least one connecting portion together when the housing cover is located on the housing base,
the at least one connecting portion is designed such that, when the housing is subjected to a predetermined force that results in deformation, the at least one connecting portion allows the first and second accommodating portions to move relative to one another in a predetermined manner as a result of the deformation,
the base portion of the at least one connecting portion of the housing base and/or the cover portion of the at least one connecting portion of the housing cover comprises at least one chamfer, and
the at least one chamfer is formed such that, during relative movement of one accommodating portion in a direction of the other accommodating portion, an end of the releasable clamp contacts the at least one chamfer and, when a predetermined distance between the one and the other accommodating portions is reached, the releasable clamp is released via a force exerted by the at least one chamfer on the end of the clamp in a direction parallel to a longitudinal direction of the motor vehicle.

12. The vehicle according to claim 11, wherein the vehicle is a hybrid or electric vehicle.

* * * * *